US012218854B2

(12) United States Patent
Brand et al.

(10) Patent No.: US 12,218,854 B2
(45) Date of Patent: Feb. 4, 2025

(54) LUMINAIRE NETWORK SYSTEM

(71) Applicant: Schreder S.A., Brussels (BE)

(72) Inventors: Daniel Brand, Wedemark (DE); Raoul Van Bergen, Bornheim (DE)

(73) Assignee: Schreder S.A., Brussels (BE)

(*) Notice: Subject to any disclaimer, the term of this patent is extended or adjusted under 35 U.S.C. 154(b) by 493 days.

(21) Appl. No.: 17/424,317

(22) PCT Filed: Feb. 7, 2020

(86) PCT No.: PCT/EP2020/053153
§ 371 (c)(1),
(2) Date: Jul. 20, 2021

(87) PCT Pub. No.: WO2020/161311
PCT Pub. Date: Aug. 13, 2020

(65) Prior Publication Data
US 2022/0158948 A1    May 19, 2022

(30) Foreign Application Priority Data
Feb. 7, 2019   (NL) ..................................... 2022526

(51) Int. Cl.
*H04L 47/56*   (2022.01)
*H05B 47/19*   (2020.01)
(52) U.S. Cl.
CPC .......... *H04L 47/564* (2013.01); *H05B 47/19* (2020.01)
(58) Field of Classification Search
CPC ... H04L 47/564; H04L 47/32; H04L 47/6215; H04L 47/6225; H04L 47/56; H05B 47/19
See application file for complete search history.

(56) References Cited

U.S. PATENT DOCUMENTS 6,816,458 B1 *  11/2004  Kroon .................. H04L 69/163
                                                   370/395.42
2010/0253809 A1 * 10/2010  Jensen ................. H04N 1/2112
                                                   348/E5.025
(Continued)

FOREIGN PATENT DOCUMENTS

EP      1189395 A2    3/2002
WO   2013016534 A1    1/2013
WO   2017182181 A1   10/2017

OTHER PUBLICATIONS

PCT International Search Report and Written Opinion, Application No. PCT/EP2020/053153, mailed Apr. 3, 2020, 14 pages.

*Primary Examiner* — Sudesh M Patidar
(74) *Attorney, Agent, or Firm* — McDonnell Boehnen Hulbert & Berghoff LLP

(57)    ABSTRACT

Example embodiments relate to luminaire network systems. One example luminaire network system includes one or more luminaires. A luminaire of the one or more luminaires is provided with a luminaire controller and a storage device configured to store messages to be transmitted in a queue. The luminaire controller is configured to associate a message in the queue with an indication of a time before which the message needs to be transmitted. The luminaire controller is also configured to check whether the indication of at least one message of a plurality of messages in the queue indicates that the at least one message has to be transmitted. Additionally, the luminaire controller is configured to transmit the plurality of messages in the queue, when a result of the checking is that the at least one message has to be transmitted.

17 Claims, 7 Drawing Sheets

(56) References Cited

U.S. PATENT DOCUMENTS

| | | | |
|---|---|---|---|
| 2014/0028200 A1* | 1/2014 | Van Wagoner | H05B 47/18 |
| | | | 315/307 |
| 2015/0087274 A1* | 3/2015 | VanBlon | G06F 1/3231 |
| | | | 455/414.1 |
| 2019/0097835 A1* | 3/2019 | Bhat | G06F 8/654 |

* cited by examiner

| message type | Δt (sec) |
|---|---|
| 1 | 70 |
| 2 | 600 |
| 3 | 6000 |
| 4 | 60.000 |

FIG 6

LUMINAIRE NETWORK SYSTEM

CROSS-REFERENCE TO RELATED APPLICATIONS

The present application is a national stage entry of PCT/EP2020/053153 filed Feb. 7, 2020, which claims priority to NL 2022526 filed Feb. 7, 2019, the contents of each of which are hereby incorporated by reference.

FIELD OF INVENTION

The field of the invention relates to luminaire network systems comprising one or more luminaires Particular embodiments relate to the field of luminaire network systems capable of transmitting messages.

BACKGROUND

The development of wireless networks using luminaire networks has increased significantly over the last couple of years and such wireless networks are being installed using luminaires in cities or along the roads.

The node of an outdoor luminaire network typically comprises an outdoor lighting controller (OLC) capable of managing one or more lighting devices by means of communication protocols. The OLCs may form a large network in which the communication links are based e.g. on IEEE 802.15.4 or on a LoRa wireless data communication technology. The network may be managed from the back-end by means of a plurality of segment controllers connecting the networks with the Internet. In such a solution an OLC includes a central processing unit (CPU) and a communication interface. In addition or alternatively, the OLC itself may be capable of communicating directly with the Internet.

Surveillance plays an increasingly important role in various outdoor environments, such as monitoring traffic and environmental conditions, improving safety, and responding to emergencies. Such surveillance data are often required to be delivered to a back-end server within a certain time frame. Also, operational data of a luminaire, such as data indicative for a broken component, e.g. a broken light source, data regarding the energy consumption of the luminaire, a light level, etc. are often required to be delivered to a back-end server in time.

Real-time monitoring as well as "after the fact" capture of environment data such as audio, video, image, air quality data has many useful applications from monitoring places with strict security requirements to providing a sense of safety and security in public spaces, e.g. parks, roadways, etc.

While wireless systems exist, limited communication bandwidth provided by the current wireless network technologies is a significant bottleneck for covering large areas. Therefore, most existing systems are deployed only in critical areas, i.e. mainly where security concerns justify the high deployment and maintenance costs. On the other hand, locally storing and later recovering the data from every luminaire is an alternative for a limited number of luminaires, but it becomes inefficient for large luminaire networks.

Outdoor luminaires are natural choices to capture environmental data to monitor streets, parking lots, parks, and other outdoor areas. Outdoor lighting networks (OLNs) exist that are used to control and manage outdoor luminaires. OLNs can be also used to transmit the local data available at the luminaire to one or more remote servers, such as monitoring centers. Thus, utilizing OLNs has the potential of significantly reducing the cost of implementing a surveillance network for a large scale environment.

However, currently, local data is usually transmitted over a network where the transmission cost is linked to the number of packets sent and to the number of transmissions performed. As local data is constantly generated, the cost may rapidly increase. Communication technologies used by OLNs include ZigBee, WiFi, cellular (GPRS, 3G/4G/5G), and power line communication networks, which normally have limited bandwidth.

SUMMARY

The object of embodiments of the invention is to provide a luminaire network system capable of transmitting local data available in a luminaire in a more efficient way.

According to a first aspect there is provided a luminaire network system comprising one or more luminaires. A luminaire of the luminaire network system is provided with a luminaire controller and a storage device configured to store messages to be transmitted in a queue. The luminaire controller is configured to
associate a message in the queue (Q) with an indication of a time before which the message needs to be transmitted;
check whether the indication of at least one message of a plurality of messages in the queue indicates that said at least one message has to be transmitted;
transmit the plurality of messages in the queue, when a result of the checking is that said at least one message has to be transmitted.

In other words, the luminaire controller will check whether any one or more messages in the queue needs to be sent urgently, and, in that case, it will transmit both urgent and non-urgent messages stored in the queue. In that manner, the number of transmissions to be done for a plurality of messages can be reduced, as messages will typically be kept in the queue until a message needs to be sent based on the indication associated with the message. This will allow for an optimized usage of the duty cycle, i.e. an optimized usage of the time the controller is transmitting. The optimized duty cycle usage will be especially advantageous in networks with a limited duty cycle, such as in Low Power Wide Area Networks (LPWAN) such as LoRaWan or SigFox. Also, embodiments of the invention result in an improved use of payload, i.e. an improved use of the frame portion in which the message data is to be included. Indeed, the payload will be better used, since more messages, and hence more packets, can be included in the payload portion of a frame compared to prior art solutions.

The indication is an indication of a time before which the message needs to be transmitted. In other words, the indication may indicate the latest time before which the message needs to be submitted. It is noted that not all messages need to get an exact time indication. For example, non-urgent messages may be stored in queue without a time indication. Further, the indication may be an exact time indication but may also be a priority indication, e.g. as soon as possible, and more generally any indication providing guidance on when the message has to be transmitted.

According to an exemplary embodiment, the luminaire network system further comprises at least one measurement device configured to measure data related to the corresponding luminaire and/or to the environment thereof, and the luminaire controller is configured to include said measured data and/or processed data based thereon, in a message and store it in the queue of the storage device. For example, the measurement device may be an energy consumption measurement circuit, a broken light source detection circuit, a light level sensor, a microphone, a particle sensor, a camera, an electric grid perturbation detection device (e.g. SPD activation detector, power cut-off detector), a temperature sensor (ambient temperature and/or luminaire temperature), a humidity sensor (ambient humidity and/or luminaire humidity), a vibration sensor, etc.

Preferably, the data measured by the at least one measurement device is any one of the following or a combination thereof: a measure indicative for a broken light source, a measure for the energy consumption of the luminaire, a light level, sound data, audio data, air quality data, image data, visibility data, electric grid perturbation data, temperature data, humidity data, vibration data.

In other words, the measured data may include luminaire operational data and/or surveillance data, and depending on the content of this data, messages may have to be transmitted to a back-end server more or less urgently. Using embodiments of the present invention messages based on the measured data are put in the queue together with an indication of a time before which the message needs to be transmitted.

According to an exemplary embodiment, the indication comprises a delay time period within which the message needs to be transmitted and a time reference, e.g. a timestamp such as a timestamp including the date and the UTC time. The delay time period may be a maximum delay time period ($\Delta t$) after the time reference ($t_0$), within which the message has to be transmitted, i.e. the message has to be transmitted before ($t_0+\Delta t$). The time reference may be e.g. a reference for a point in time on which the message was created, or a reference for a point in time on which the measured data included in the message was measured. For example, in case of a broken lamp message, the latter will be preferred.

Optionally, the time reference may be sent together with the message. For example, when the message indicates a broken lamp, it may be desirable to know when the lamp was broken, and to that end the time reference may be transmitted together with the broken lamp message.

It is further noted that, when working with a time reference and a delay time, not all messages in the queue need to be associated with a time reference. For example, a first message in the queue may be associated with a first time reference and a first delay time, and a number of following messages may use the same first time reference together with an incremental value and a delay time.

Preferably, the luminaire controller is configured to select the delay time from a plurality of possible different delay times. The luminaire may then be configured to determine the delay time based on the type/content of a message. For example, a broken lamp message may be associated with a shorter delay time than a message containing data on energy consumption.

According to another exemplary embodiment, the indication comprises an absolute time by which the message needs to be sent. The absolute time may be provided in the form of a timestamp such as a timestamp including the date and the UTC time by which the message needs to be sent at the latest.

The luminaire may then be configured to determine the absolute time based on the type/content of a message and optionally also taking into account a time on which the measured data included in the message was measured.

According to another exemplary embodiment, the luminaire controller is configured to select the indication from a plurality of priority levels, each priority level being associated with a time before which a message needs to be transmitted.

For example, a highest priority level may indicate that the message has to be sent as soon as possible, whilst a lowest priority level may correspond with a message that has to be sent within one week.

According to an exemplary embodiment, the luminaire network system further comprises a user or operator device configured to provide a user or operator with a user interface allowing the user or operator to set for each message type of a plurality of message types, an indication of a time before which said message type needs to be transmitted, and to communicate said settings to the luminaire controller. The luminaire controller may then be further configured to associate a message to be transmitted with an indication of a time before which the message needs to be transmitted based on said settings.

In other words, by providing such an interface, a user can choose how fast messages should be sent. Such a user interface may be further adapted to the user: e.g. a first user, e.g. a luminaire network operator, may be presented with a first interface, e.g. an interface allowing to set indications for message types relating to operational data, whilst a second user, e.g. a surveillance operator such as the police services, may be presented with a second interface, e.g. an interface allowing to set indications for message types relating to surveillance data.

According to an exemplary embodiment, the luminaire controller is configured to transmit all messages in the queue when the queue is full and/or to delete one or more messages of the queue when the queue is full.

For example, when the queue is full, and the communication means of the luminaire network system are working normally, all messages in the queue may be transmitted. Such a situation may happen when a queue is rather small and no urgent messages are present in the queue. When the communication means of the luminaire network system are failing, the messages remain stored in the queue without being transmitted, filling up the queue. In a situation where the queue is full, and the communication means of the luminaire network system fail, one or more messages in the queue may be deleted, to provide the possibility to store more recent or urgent messages in the queue. In that event, the luminaire controller may be configured to delete one or more messages which are less urgent, whilst keeping the urgent messages. In other words, the decision on which messages have to be deleted may be based on the indications of a time before which a message needs to be transmitted associated with the messages. However, also other criteria may be used to determine which messages are deleted. For example, a simple round-Robin algorithm could be used, deleting first the message that has been in the queue the longest.

According to an exemplary embodiment, the luminaire controller is configured to check at predetermined moments in time, preferably periodically, whether the indication of any message of said plurality of messages in the queue indicates that said message has to be transmitted.

Preferably, the checking intervals should be much smaller than the shortest delay time within which a message may have to be sent, so that all messages will be sent in time.

According to an exemplary embodiment, the luminaire controller is further configured to take into account preferred transmission time frames for determining when to transmit the plurality of messages in the queue. For example, when a preferred transmission time is coming up, and a sufficient number of messages is present in the queue, it may be determined to transmit all messages in the queue. In another example, the preferred transmission time could be e.g. between 12 pm and 6 am, and it may then be decided to transmit all messages in the queue e.g. between 5 am and 6 am, even though the most urgent messages are only due after 6 am.

According to an exemplary embodiment, the storage device is configured to store messages to be transmitted in a plurality of queues. The luminaire controller may then be configured to associate said plurality of queues with a plurality of transmission schemes, wherein according to at least one transmission scheme thereof the luminaire controller is configured to associate a message in the queue with an indication of a time before which the message needs to be transmitted; and to transmit a plurality of messages in the queue, when the time indication of at least one of the messages of said plurality of messages indicates that said at least one message has to be transmitted.

In other words, at least one queue of the plurality of queues may be controlled in the same manner as has been described above for the previous embodiments. The other queues may be controlled in the same manner or in a different manner, e.g. Round-Robin queue.

The plurality of queues allows to store messages e.g. by category/application or by ownership/destination and/or by urgency.

Preferably, the plurality of queues comprises at least one queue to store luminaire operational data such as light application data, and at least one queue to store environment data, such as image data, audio data, air quality related data, temperature data, visibility data, electric grid perturbation data, humidity data, vibration data, etc. Also, there may be provided different queues for different types of environment data or for different types of luminaire operational data.

Also, when messages have to be sent to different "owners" or destinations, it is advantageous to use different queues, preferably at least one queue per owner/destination. For example, a queue with environment data could have a police server as the owner or destination, whilst a queue with light application data would have a luminaire network operator as the owner or destination.

For example, the queue with the luminaire operational data may be controlled by the luminaire controller according to any one of the embodiments described above, whilst the queue with the environment data may be controlled in a different manner. For example, the latter queue could be a round-Robin queue, and the messages stored in the queue may be sent only upon request. For example, when a queue stores diagnostic data, it may be sufficient to only send the data upon request.

Further, using multiple queues may be useful when the luminaire controller is configured to take into account preferred transmission time frames for determining when to transmit the plurality of messages in the queue. E.g. one of the queues could be a queue with messages which are only sent during a preferred transmission time frame.

According to an exemplary embodiment, the luminaire controller is configured to transmit the plurality of messages in the queue through a cellular network. Optionally, the luminaire controller may be configured to process and/or compress the plurality of messages, and to send the processed and/or compressed plurality of messages through the cellular network to a remote device. In the latter case, decompression may be done at the remote device.

This will allow transmitting the plurality of messages directly to a back-end server, and receiving any request messages directly from the back-end server. In some luminaire networks, the majority of the luminaire controllers may be provided with communication means for transmitting packages through a cellular network, but in other embodiments only some luminaire controllers may be provided with communication means for transmitting packages through a cellular network.

According to an exemplary embodiment, the luminaire network system comprises an edge routing luminaire controller, wherein the luminaire controller is configured to transmit the plurality of messages in the queue to the edge routing luminaire controller, and wherein the edge routing luminaire controller is configured to transmit the plurality of messages of said queue through a cellular network.

This will allow transmitting the plurality of messages indirectly to a back-end server via the edge routing luminaire controller, and receiving any request messages indirectly from the back-end server. In such networks, a plurality of luminaires may be connected e.g. through a mesh network such as a Zigbee network, or through a star-network such as LoRaWAN, with only some edge routing luminaire controllers capable of performing communication through a cellular network. The skilled person will understand that the plurality of luminaires may be connected either through short-range communication protocols or long-range communication protocols. The plurality of messages is then first transmitted through the mesh or star-network to the edge routing luminaire controller, and from there to the back-end server.

Optionally, the edge routing luminaire controller may be configured to process the received plurality of messages and to send resulting data through the cellular network. In other words, optionally the edge routing luminaire controller may have also a computing/processing function. For example, when the edge routing luminaire controller receives light sensor data from a plurality of nearby luminaire controllers, it may calculate an average value of the light sensed within a certain time frame, and send the average value through the cellular network.

According to an exemplary embodiment, the luminaire controller is configured to compress the plurality of messages in the queue and to transmit the compressed plurality of messages to the edge routing luminaire controller. The edge routing luminaire controller may then be configured to decompress the compressed plurality of messages to send the decompressed plurality of messages, optionally in processed form, through the cellular network. Alternatively, the edge routing luminaire controller may be configured to send the compressed plurality of messages to the back-end server.

Optionally, the edge routing luminaire controller may compress or recompress the plurality of messages, optionally in a processed form, using a different compression technique than the technique used by the luminaire controller, resulting in a compression format which is more suitable for the transmission through the cellular network. In another embodiment, the luminaire controller may send the plurality of messages uncompressed, and the edge routing luminaire controller may compress the plurality of messages, optionally in a processed form.

In that manner the bandwidth required to send the messages to the edge routing luminaire controller, e.g. through a mesh or star-network, can be reduced.

According to an exemplary embodiment, the luminaire controller is configured to transmit the plurality of messages in the queue to the edge routing luminaire controller using an IEEE 802.15.4-based protocol, preferably a Zigbee protocol.

Preferably, the luminaire controller is configured to transmit the plurality of messages in the queue to the edge routing luminaire controller using a wireless personal area network (WPAN), preferably as defined in the IEEE 802.15.4 standard.

According to another exemplary embodiment, the luminaire controller is configured to transmit the plurality of messages in the queue to the edge routing luminaire controller through an LPWAN network, e.g. a LoRaWAN network or a SigFox network.

According to an exemplary embodiment, the luminaire controller is configured to transmit the plurality of messages in the queue when a trigger transmit message is received or generated.

A trigger transmit message may be received from a remote device, or may be generated locally, e.g. based on operator or user pushing a button provided in or on the luminaire, e.g. an alarm button, or may be based on sensed data.

According to an exemplary embodiment, the luminaire controller is configured to delete one or more messages in the queue or all messages in the queue, when a trigger delete message is received.

A trigger delete message may be received from a remote device, or may be generated locally, e.g. when the communication means fails and the queue is full.

According to an exemplary embodiment, the luminaire controller is further configured for storing the messages in the storage device in a Round-Robin queue. Additionally, the luminaire may further comprises an image capturing device, and the luminaire controller is further configured for storing image data captured by the image capturing device in the Round-Robin queue of the storage device.

In such an embodiment, as described above, the data in the Round-Robin queue may be transmitted using a different transmission scheme, wherein the data is e.g. only sent upon request. A request may be a request received from a remote back-end server, or may be a request generated locally, e.g. when an alarm button is pushed.

According to a further aspect of the invention, there is provided a computer program comprising computer-executable instructions to perform or control the steps performed by the luminaire controller, when the program is run on a computer, according to any one of the embodiments of the luminaire controller disclosed above. According to a further aspect of the invention, there is provided a computer device or other hardware device programmed to perform or control the steps performed by the luminaire controller of any one of the embodiments disclosed above. According to another aspect there is provided a data storage device encoding a program in machine-readable and machine-executable form to perform or control the steps performed by the luminaire controller of any one of the embodiments disclosed above.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 6 is a table illustrating a list showing various message types associated with delay times.

DESCRIPTION OF EMBODIMENTS

Figure 1:
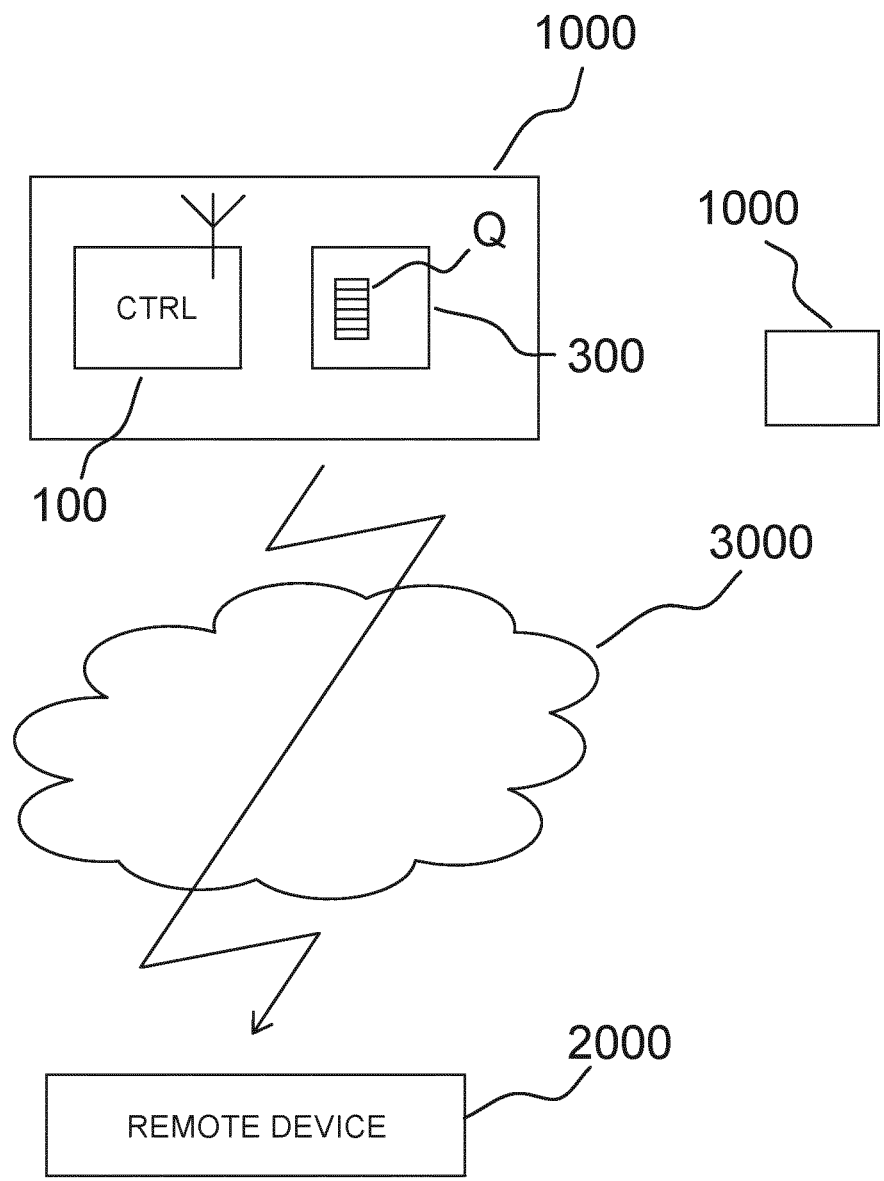
FIGS. 1, 2 and 3 are schematic diagrams of three exemplary embodiments of a luminaire network system.

FIG. 1 illustrates a luminaire network system comprising a plurality of luminaires 1000, a remote device 2000, and a cellular network 3000. A luminaire 1000 is provided with a luminaire controller 100 and a storage device 300 configured to store messages to be transmitted in a queue Q. The luminaire controller 100 is configured to associate a message in the queue Q with an indication of a time before which the message needs to be transmitted. The luminaire controller is further configured to check whether the indication of at least one message of a plurality of messages in the queue indicates that said at least one message has to be transmitted, and to transmit the plurality of messages in the queue, when the result of the checking is that said at least one message has to be transmitted. Thus, the luminaire controller 100 will check whether any message in the queue needs to be sent urgently, and, in that case, it will transmit the plurality of messages stored in the queue, i.e. also non-urgent messages which do not have to be sent at that time. By implementing such a transmission control scheme, the number of transmissions to be done can be reduced compared to a situation where the messages in the queue are sent at regular time intervals. Indeed, as long as no urgent messages are present in the queue, those messages are not transmitted, reducing the number of transmissions. Also, because more messages will be sent per transmission, the transmission can be done more efficiently. Indeed, since more messages will have to be sent at a time, the transmitted packets can be better filled. In that regard, it is noted that the messages may have different sizes, and that some messages will have a very small size such that multiple messages can be included in a single packet.

The messages stored in the queue may relate e.g. to luminaire operational data or surveillance data. Luminaire operational data may be data such as an indication for a broken light source, a measure of the energy consumption of the luminaire over a predetermined time period, a measured light level, electric grid perturbation data, temperature data, humidity data, vibration data, etc. Surveillance data may include e.g. environmental data, such as sound data, audio data, air quality data, image data, visibility data, temperature data, humidity data, vibration data, etc. Whenever a luminaire controller puts a message in the queue, it decides whether a time indication should be added. For example, a message indicating a broken light source will have to be sent within a short time frame, whilst a message containing data on the energy consumption e.g. over the past day, will not need to be sent as urgently as the broken light source message. Also, for non-urgent messages, it may be decided not to put any time indication.

The luminaire controller 100 may be further configured to transmit all messages in the queue when the queue is full, and/or to delete one or more messages in the queue when the queue is full. For example, when the queue is full, and the communication means of the luminaire network system are working normally, all messages in the queue may be transmitted. On the other hand, in a situation where the queue is full, and the communication means of the luminaire network system fail, one or more messages in the queue may be deleted, to be able to store more recent or urgent messages in the queue. In that event, the luminaire controller may be configured to delete one or more messages which are less urgent, whilst keeping the urgent messages. In other words, the decision on which messages have to be deleted may be based on the indications of a time before which a message needs to be transmitted associated with the messages. However, also other criteria may be used to determine which messages are deleted. For example, a simple round-Robin algorithm could be used, deleting first the message that has been in the queue the longest.

Preferably, the luminaire controller 100 is configured to check at predetermined moments in time, more preferably periodically, whether the indication of any message of the plurality of messages in the queue indicates that the message has to be transmitted. For example, the queue may be checked every minute. Typically, the time period for checking the queue may be between ten seconds and five minutes. This time period may further be set in function of the shortest delay time within which a message needs to be transmitted.

In the embodiment of FIG. 1, the luminaire controller 100 is configured to transmit a plurality of messages in the queue Q through a cellular network 3000. However, in other embodiments, see e.g. the embodiment of FIG. 3, the controller 100 may also be configured to communicate through a communication protocol which has a smaller maximal transmission distance than the transmission distance of the cellular network 3000. As will be explained in connection with FIG. 3, in that case, the controller 100 may send the plurality of messages stored in the queue indirectly to the remote device 2000. Further, in the embodiment of FIG. 1, only one remote device 2000 is shown, but the skilled person understands that the luminaire 1000 may be provided with multiple queues Q, and that the multiple queues Q may be associated with different remote devices. This will be further explained in connection with FIG. 2.

The luminaire controller 100 may be further configured to transmit the plurality of messages in the queue when a trigger transmit message is received or generated. Such a trigger transmit message may be received from the remote device 2000, or from a different remote device, or may be generated locally, e.g. based on sensed data from the luminaire associated with the luminaire controller 100 or from another remote luminaire or device. For example, an operator or user pushing a button provided in or on the luminaire may cause a trigger transmit message to be generated. Also, a trigger transmit message may be generated e.g. when the luminaire obtains information that the cellular network 3000 will no longer be operational in the near future, or may be generated based on sensed data. Also, the luminaire 100 may be configured to delete one or more messages or all the messages in the queue when a trigger delete message is received. This may happen when e.g. the communication means fails or when there is a problem with the network, and when the queue is full. The luminaire controller may then decide to delete all messages in the queue, or to delete one or more messages in the queue, e.g. based on the indication of a time before which a message needs to be transmitted associated with the message. For example, it may be decided to delete only the non-urgent messages, and to keep the more urgent messages. However, as explained above, also other criteria may be used to determine which messages are deleted.

Figure 2:
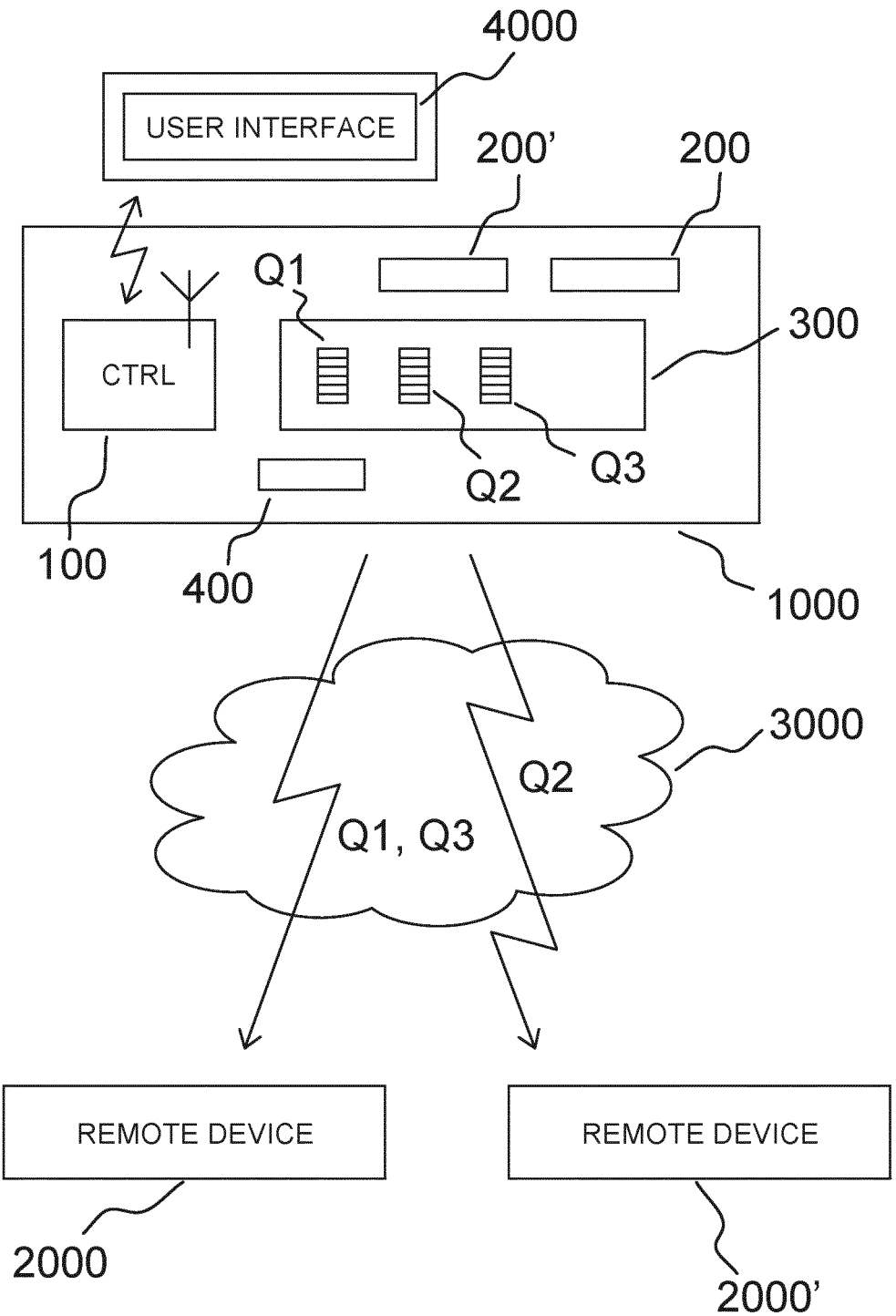

FIG. 2 illustrates a second exemplary embodiment of a luminaire network system, wherein similar components have been indicated with the same reference numeral. In the example of FIG. 2, the luminaire network system further comprises a user interface device 4000. The user interface device 4000 may be e.g. a mobile device or a remote server. In some examples, the user interface may also be provided in a remote device 2000, 2000'. Further, the luminaire 1000 comprises a number of measurement devices 200, 200', 400 configured to measure data relating to the corresponding luminaire 1000 and/or to the environment. A measurement device 400 may be e.g. an image capturing device. The storage device 300 is configured to store messages to be transmitted in a plurality of queues Q1, Q2, Q3. The plurality of queues Q1, Q2, Q3 may be associated with a plurality of transmission schemes. For example, queue Q1 may be associated with a transmission scheme which consists in associating a message in the queue Q1 with an indication of time before which the messages needs to be transmitted, and transmitting a plurality of messages in the queue, when the time indication of at least one of the messages of said plurality of messages indicates that said at least one message has to be transmitted. In other words, queue Q1 may operate as described in connection with FIG. 1.

The luminaire controller 100 is further configured to include data measured by one of the measurement devices 200, 200', 400 and/or processed data based thereon, in a message, and to store the message in one of the queues Q1, Q2, Q3 of the storage device 300. The data measured by the measurement devices 200, 200', 400 may be any one of the following or a combination thereof: a measure indicative for a broken light source, a measure for the energy consumption of the luminaire, a light level, sound data, audio data, air quality data, image data, visibility data, electric grid perturbation data, temperature data, humidity data, vibration data, etc. The one or more measurement devices 200, 200', 400 may include any one or more of the following: an energy consumption measurement circuit, a broken light source detection circuit, a light level sensor, a microphone, a particle sensor, a camera, an electric grid perturbation detection device (e.g. SPD activation detector, power cut-off detector), a temperature sensor (ambient temperature and/or luminaire temperature), a humidity sensor (ambient humidity and/or luminaire humidity), a vibration sensor, etc. More generally, any measurement device capable of obtaining luminaire operational and/or surveillance data may be included in the luminaire 1000. The measured data may be stored in any one of the queues Q1, Q2, Q3, e.g. based on the type of measured data. For example, messages related to luminaire operational data may be stored in queue Q1, and messages related to environment data may be stored in queue Q2 or Q3. More in particular, e.g. queue Q2 may store image data, whilst queue Q3 may store audio data.

In a possible embodiment, the image capturing device 400 captures images and stores those images in queue Q2. Queue Q2 may then be a round robin queue. Queue Q2 may be controlled according to a different transmission scheme. For example, the transmission scheme used to control queue Q2 may be that the image data is only sent upon request. A request may be received from a remote device 2000', or may be a request generated locally, e.g. when a button such as an alarm button is pushed.

The data stored in queues Q1, Q2, Q3 may be sent to different remote devices 2000, 2000'. For example, data from queues Q1, Q3 may be sent to a first remote device 2000, and the image data stored in queue Q2 may be sent to a different remote device 2000'. The first remote device may be e.g. a remote device of a luminaire operator, whilst remote device 2000' may be a remote device operated by a surveillance operator such as the police.

Figure 6:
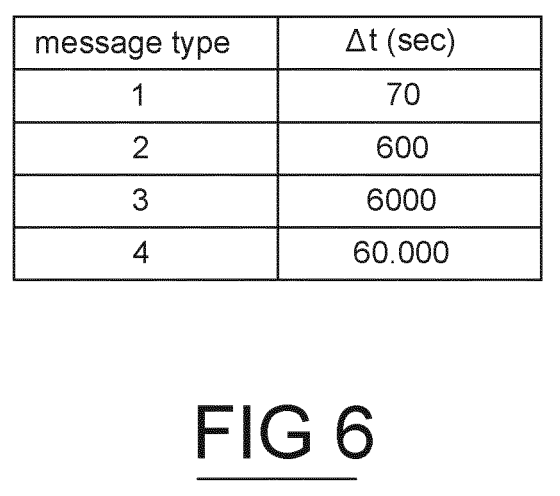

The user interface included in the user or operator device 4000 is configured to provide a user or operator with a user interface allowing the user or operator to set for each message type of a plurality of message types, an indication of time before which a message of said message type needs to be transmitted, and to communicate said settings to the luminaire controller 100. An example of a possible user interface is illustrated in FIG. 6. FIG. 6 shows a table with a plurality of different message types indicated as 1, 2, 3, 4. It will be understood that instead of putting numbers 1, 2, 3, 4 there may be put an explanation of what kind of messages are intended. For example, message type 1 could be a message type indicating a broken light source. The second column indicates a delay time within which the message of a particular message type has to be sent. These values may be set by a user or an operator. The luminaire controller is then further configured to associate a message to be transmitted with an indication of a time before which the message needs to be transmitted, based on the settings filled out by the user or operator in the list.

Figure 3:
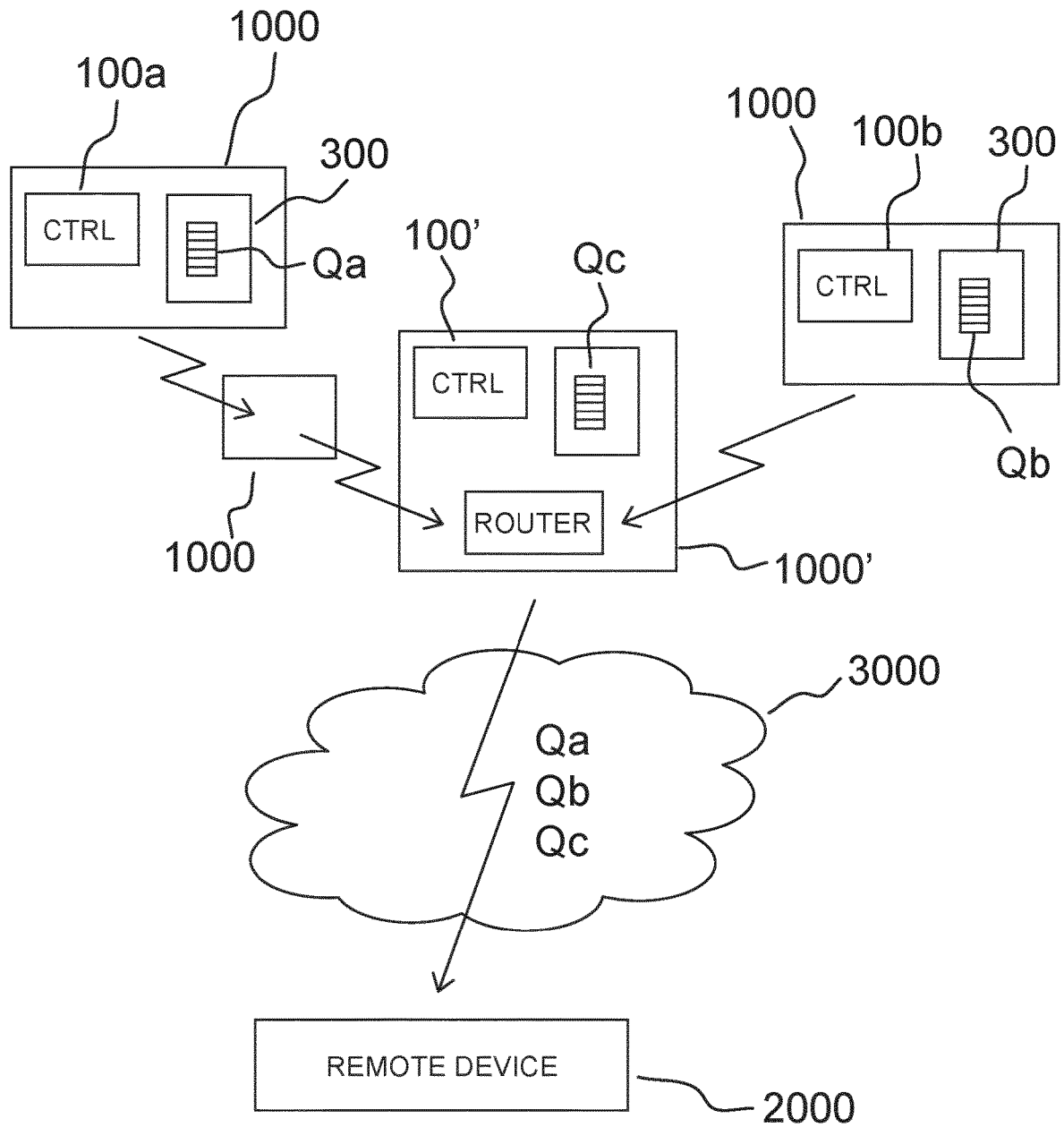

FIG. 3 illustrates yet another exemplary embodiment of a luminaire network system, wherein similar components have been referenced with the same reference numerals as those used in FIG. 1. In the embodiment of FIG. 3, the luminaire network system comprises a plurality of luminaires 1000 and an edge routing system 1000'. The edge routing system 1000' may be a luminaire, or may be a device which only comprises an edge routing luminaire controller 100'. The latter is often called a segment controller.

In the embodiment of FIG. 3, the luminaire controller 100a is configured to transmit the plurality of messages in its queue Qa to the edge routing luminaire controller 100', and the edge routing luminaire controller 100' is configured to transmit the plurality of messages of said queue Qa through the cellular network 3000. In a similar manner, the luminaire controller 100b is configured to transmit the plurality of messages in its queue Qb to the edge routing luminaire controller 100', and the edge routing luminaire controller 100' is configured to transmit the plurality of messages of said queue Qb through the cellular network 3000.

Optionally, the luminaire controller 100a, 100b may be configured to compress the plurality of messages in the queue Qa, Qb and to transmit the compressed plurality of messages to the edge routing luminaire controller 100'. The edge routing luminaire controller 100' may either be configured to send the compressed plurality of messages of queue Qa, Qb through the cellular network 3000, or to first decompress the compressed plurality of messages of queue Qa, Qb, and to transmit the decompressed plurality of messages, optionally in processed form, through the cellular network 3000. Optionally, the edge routing luminaire controller 100' may compress or recompress the plurality of messages of queue Qa, Qb, optionally in a processed form, using a different compression technique than the technique used by the luminaire controllers 100a, 100b, resulting in a compression format which is more suitable for the transmission through the cellular network. In another embodiment, the luminaire controller 100a, 100b may send the plurality of messages uncompressed, and the edge routing luminaire controller 100' may compress the plurality of messages, optionally in a processed form.

In the embodiment of FIG. 3, the luminaire controllers 100a, 100b may be configured to transmit the plurality of messages in the queues Qa, Qb to the edge routing luminaire controller 100' using a first protocol. The first protocol may be e.g. an IEEE 802.15.4-based protocol, such as a Zigbee protocol, or a LPWAN protocol such as LoRa or SigFox. More generally, any suitable protocol may be used. In that case, the luminaire controllers 100a, 100b will be configured to transmit the plurality of messages in their queues Qa, Qb in a wireless manner to the edge routing luminaire controller 100'. In that manner, the luminaire controllers 100a, 100b may communicate with each other e.g. as in a mesh network or star-network, whilst the edge routing luminaire controllers 100' may additionally communicate with a remote device 2000 through the cellular network 3000'. Optionally, the edge routing system 1000', which may include a luminaire, may further be configured to store messages in a queue Qc in a similar way as is done in luminaires 1000. The plurality of messages stored in queue Qc can then be transmitted directly through the cellular network 3000 to the remote device 2000.

Figure 4:
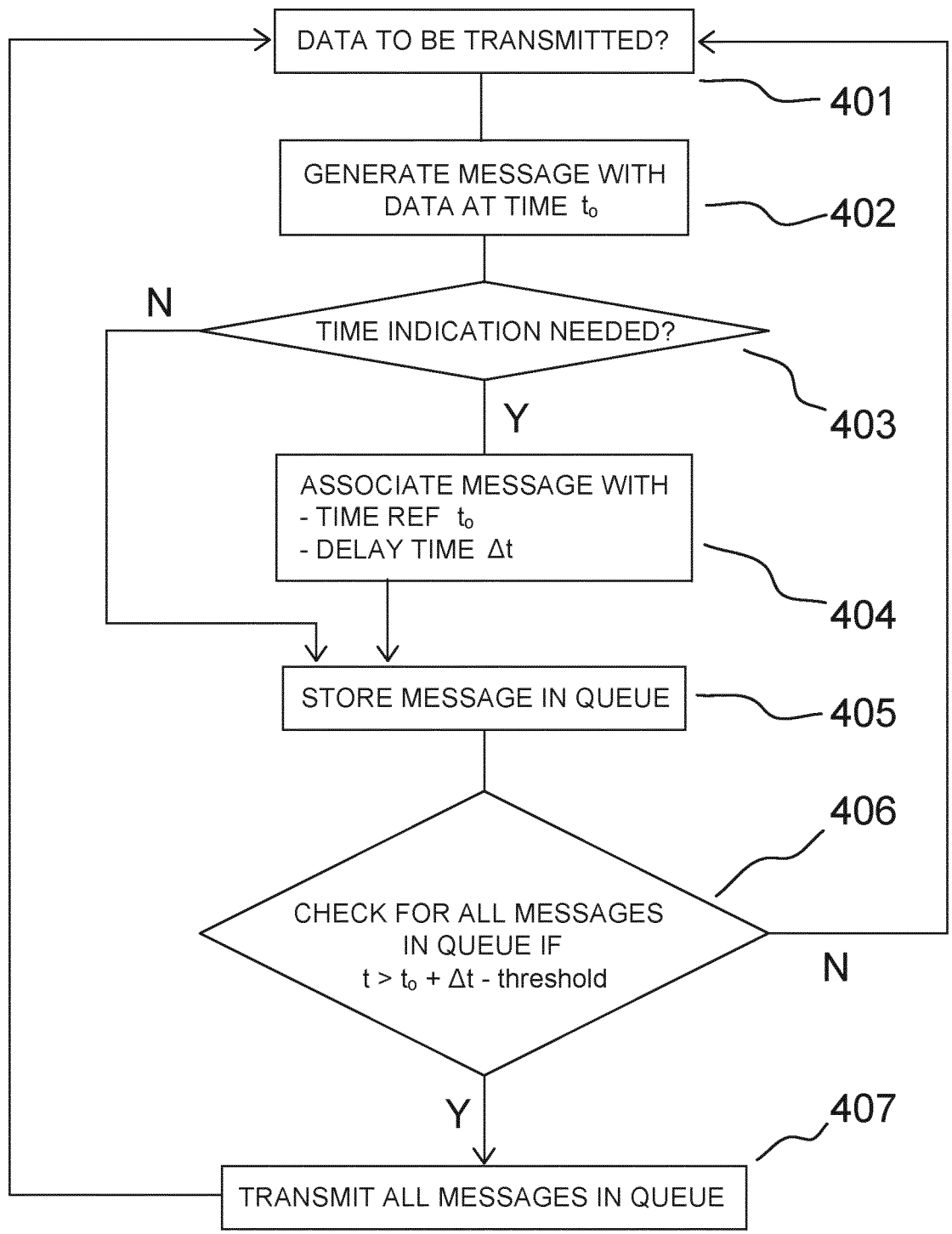
FIG. 4 is a flowchart illustrating the steps performed by a luminaire controller according to an exemplary embodiment.

FIG. 4 illustrates an exemplary embodiment of the steps performed or controlled by the luminaire controller 100. In a first step 401, it is checked whether data needs to be transmitted. When data needs to be transmitted, a message with the data is generated at time $t_0$ in step 402. In a third step 403, it is checked whether a time indication is needed for the type of message that has been generated in step 402. If a time indication is needed, in step 404, the message is associated with a time reference $t_0$ and a delay time $\Delta t$. In step 405, the message is stored in a queue. If it is determined that no time indication is needed in step 403, then the method also proceeds with step 405. In step 406, it is checked for all messages in the queue if the following condition is valid for any message in the queue: $t>(t_0+\Delta t-\text{threshold})$, wherein the threshold may be a suitable value taking into account that some time is needed between step 406 and the actual transmission of the message. If this condition is met for any one of the messages in the queue, all messages in the queue are transmitted in step 407. If the condition of step 406 is not fulfilled, the method proceeds with step 401.

Figure 5:
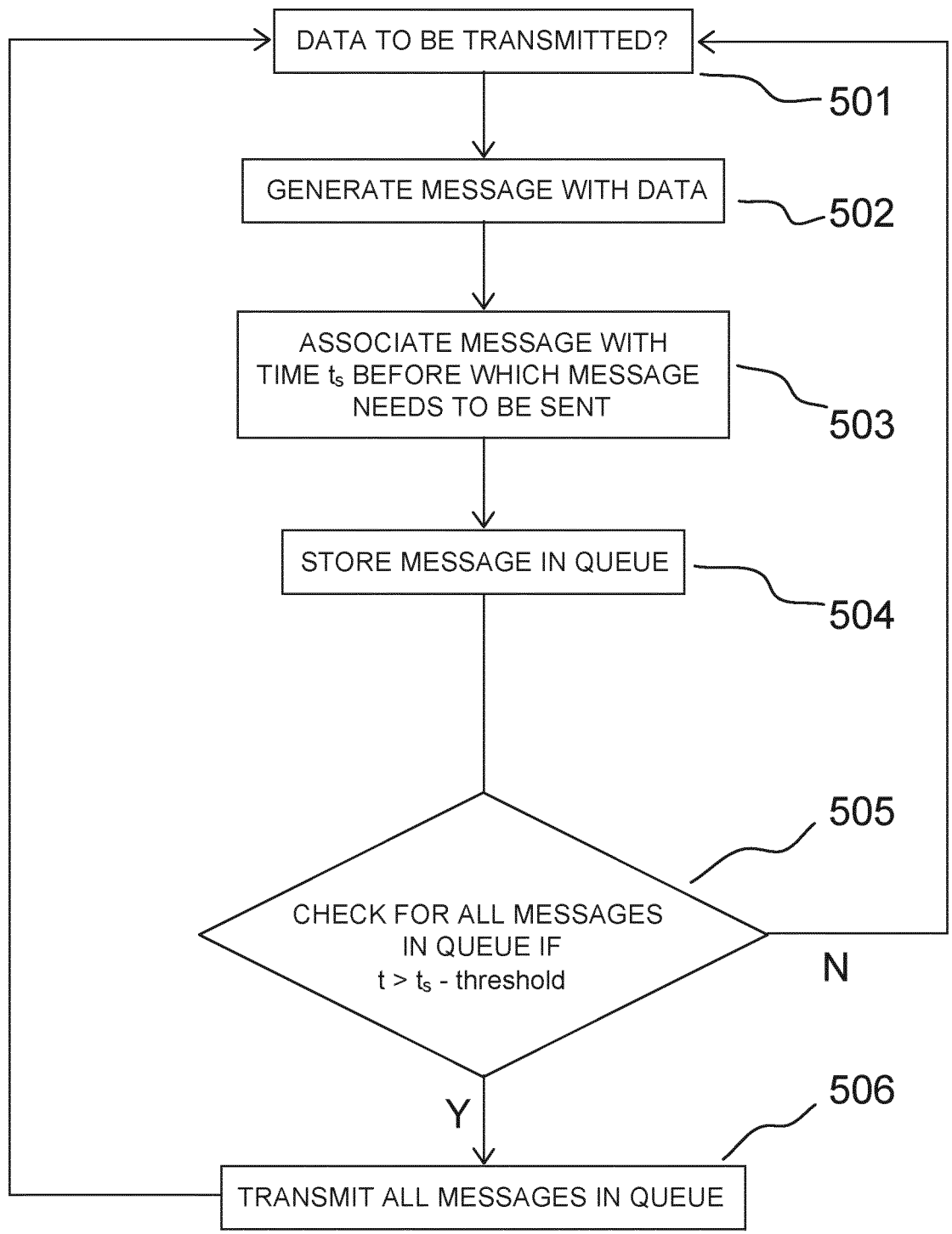
FIG. 5 is a flowchart illustrating the steps performed by a luminaire controller according to another exemplary embodiment.

FIG. 5 illustrates another exemplary embodiment of the steps which may be performed or controlled by the luminaire controller 100. Steps 501 and 502 are similar to steps 401 and 402 described above for FIG. 4. After step 502, the message to be transmitted is associated with a time $t_s$ before which the message needs to be sent. This is done in step 503. In a following step 504, the message is stored in the queue. In step 505, it is checked for all messages in the queue whether there exists a message for which the following condition is fulfilled: $t>(t_s-\text{threshold})$. If the condition is fulfilled, the method proceeds to step 506 with the transmission of all messages in the queue. If the condition is not fulfilled, the method proceeds to step 501.

In other words, in the embodiment of FIG. 4, the indication comprises a delay time period $\Delta t$ within which the message needs to be transmitted and a time reference $t_0$, e.g. in the form of a timestamp such as a timestamp including the date and the UTC time. The time reference $t_0$ may be a reference for a point in time on which the message was created, or a reference for a point in time on which the measured data included in the message was measured. For example, in case of a broken lamp message, the latter will be preferred. The delay time Δt may be selected from a plurality of possible different delay times.

The delay time period (Δt) and the time reference ($t_0$) associated with a message, indicate that the message has to be sent before ($t_0$+Δt).

Optionally, the time reference ($t_0$) may be transmitted together with the message. For example, when the message indicates a broken lamp, it may be desirable to know when the lamp was broken, and to that end the time reference ($t_0$) may be transmitted together with the associated message.

It is further noted that, when working with a time reference and a delay time, not all messages in the queue need to be associated with a time reference. For example, a first message in the queue may be associated with a first time reference and a first delay time, and a number of following messages (in the example below messages 2 and 3) may use the same first time reference and an incremental value. However, when the incremental value is too high (e.g. messages 4 and 5 in the example below), it may be preferred to include again a time reference. This is illustrated in the example below which shows a queue in which messages 1-5 have been stored one after the other, starting with message 1:

| Message 1 | Timestamp 1 | Δt1 |
| Message 2 | Incremental value 1 w.r.t. Timestamp 1 | Δt2 |
| Message 3 | Incremental value 2 w.r.t. Timestamp 1 | Δt2 |
| Message 4 | Timestamp 2 | Δt1 |
| Message 5 | Timestamp 3 | Δt3 |

In the embodiment of FIG. 5, the indication comprises an absolute time $t_s$ by which the message needs to be sent, e.g. in the form of a timestamp including the date and the UTC time by which the message has to be transmitted.

Figure 7:
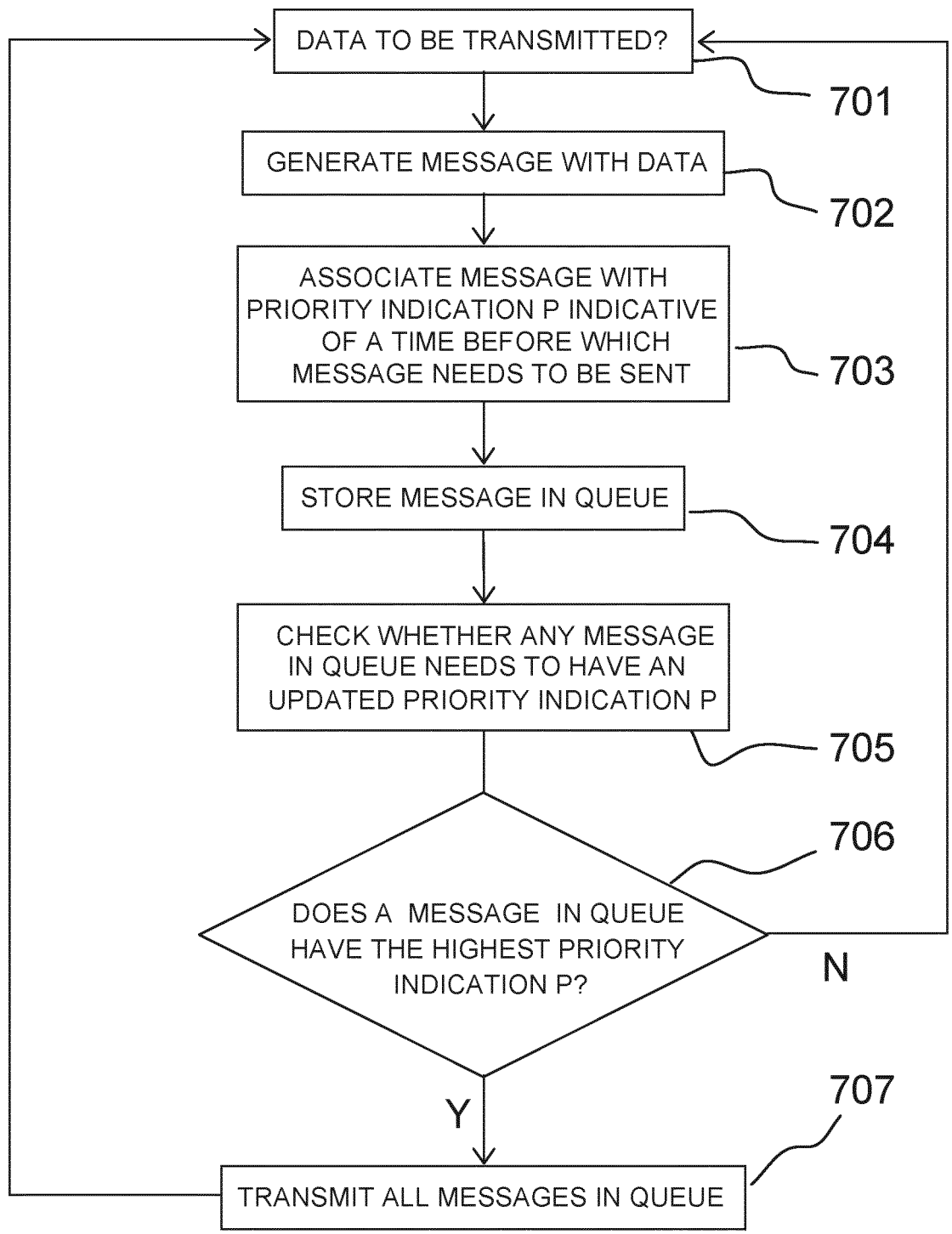
FIG. 7 is a flowchart illustrating the steps performed by a luminaire controller according to another exemplary embodiment.

FIG. 7 illustrates another exemplary embodiment of the steps which may be performed or controlled by the luminaire controller 100. Steps 701 and 702 are similar to steps 401 and 402 described above for FIG. 4. After step 702, the message to be transmitted is associated with a priority indication p indicative of a time before which the associated message needs to be sent, the highest priority indication corresponding to a message to be sent immediately. The priority indication p may be categorized into a plurality of priority levels, each of the plurality of priority levels indicative of a different transmission urgency, e g immediately, as soon as possible, to be sent last, etc. The association of the message with the priority indication p is done in step 703. In a following step 704, the message is stored in the queue.

In step 705, it is checked for all messages in the queue whether their respective priority indication p needs to be updated. Depending on embodiments, various parameters may influence the update in the priority indication p. The update in the priority indication may be an increment or a decrement in a priority level. For example, the luminaire controller 100 may automatically increment the priority level of the associated message based on a time spent by the message in the queue. In another embodiment, several identical messages from the same source or different sources may have been generated at different or similar times and, based on the number of identical messages, their priority level may be incremented since it could indicate a potentially more urgent situation. In still another embodiment, the parameter triggering the increment in the priority level may be the time of the day since it may be preferential to transmit messages during a preferred transmission time, e.g. between 12 pm and 6 am. In yet another embodiment, a diagnostic may be processed based on different messages, said diagnostic indicative of a bigger problem, thereby requiring an increase in the priority level of selected messages. The skilled person will understand that priority indications p may be incremented or decremented based on various combinations of parameters.

In step 706, it is checked for all messages in the queue whether there exists a message for which the following condition is fulfilled: p=highest priority. If the condition is fulfilled, the method proceeds to step 707 with the transmission of all messages in the queue. If the condition is not fulfilled, the method proceeds to step 701.

A person of skill in the art would readily recognize that steps performed by the luminaire controller or by the edge routing luminaire controller or by the back-end server can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps. The program storage devices may be, e.g. digital memories, magnetic storage media such as a magnetic disks and magnetic tapes, hard drives, or optically readable digital data storage media. The embodiments are also intended to cover computers programmed to perform said steps.

The functions of the various elements shown in the figures, including any functional blocks labeled as "controllers", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. A luminaire network system comprising one or more luminaires, wherein a luminaire thereof comprises:
   a luminaire controller;
   at least one measurement device configured to measure data related to at least one of the corresponding luminaire or the environment thereof,
   wherein the data measured by the at least one measurement device is any one of the following or a combination thereof: a measure indicative for a broken light source, a measure for the energy consumption of the luminaire, a light level, sound data, audio data, air quality data, image data, visibility data, electric grid perturbation data, temperature data, humidity data, and vibration data; and
   a storage device configured to store messages to be transmitted in a queue,
   wherein the luminaire controller is configured to:
      include the measured data in a message and store it in the queue of the storage device;
      associate the message in the queue with an indication of a time,
      wherein the indication of the time comprises a delay time period within which the message needs to be transmitted and a time reference and wherein the time reference is a reference for a point in time on which the measured data included in the message was measured, or wherein the indication of the time comprises an absolute time by which the message needs to be sent, or wherein the luminaire controller is configured to select the indication of the time from a plurality of priority levels, each priority level being associated with a time before which the message needs to be transmitted;
      check whether the indication of the time associated with at least one message of a plurality of messages in the queue indicates that the at least one message has to be transmitted; and
      transmit the plurality of messages in the queue, when a result of the checking is that the at least one message has to be transmitted.

2. The luminaire network system according to claim 1, wherein the indication comprises a delay time period within which the message needs to be transmitted and a time reference.

3. The luminaire network system according to claim 2, wherein the luminaire controller is configured to include the time reference associated with the message when the message is transmitted.

4. The luminaire network system according to claim 1, further comprising a user or operator device configured to provide a user or operator with a user interface allowing the user or operator to set for each message type of a plurality of message types, an indication of a time before which the each message type needs to be transmitted, and to communicate the settings for the plurality of message types to the luminaire controller, and wherein the luminaire controller is further configured to associate a message to be transmitted with an indication of a time before which the message needs to be transmitted based on the settings for the plurality of message types.

5. The luminaire network system according to claim 1, wherein the luminaire controller is configured to perform at least one of:
   transmit all messages in the queue when the queue is full; or
   delete one or more messages of the queue when the queue is full.

6. The luminaire network system according to claim 1, wherein the luminaire controller is configured to check at predetermined moments in time whether the indication of any message of the plurality of messages in the queue indicates that the any message has to be transmitted.

7. The luminaire network system according to claim 1, wherein the storage device is configured to store messages to be transmitted in a plurality of queues, wherein the luminaire controller is configured to associate the plurality of queues with a plurality of transmission schemes, wherein according to at least one transmission scheme thereof the luminaire controller is configured to associate a message in the queue with an indication of a time before which the message needs to be transmitted; and to transmit a plurality of messages in the queue, when the time indication of at least one of the messages of the plurality of messages indicates that the at least one message has to be transmitted.

8. The luminaire network system according to claim 1, wherein the luminaire controller is configured to transmit the plurality of messages in the queue through a cellular network.

9. The luminaire network system according to claim 1, comprising an edge routing luminaire controller, wherein the luminaire controller is configured to transmit the plurality of messages in the queue to the edge routing luminaire controller, and wherein the edge routing luminaire controller is configured to transmit the plurality of messages of said queue through a cellular network.

10. The luminaire network system according to claim 9, wherein the luminaire controller is configured to compress the plurality of messages in the queue and to transmit the compressed plurality of messages to the edge routing luminaire controller.

11. The luminaire network system according to claim 1, wherein the luminaire controller is configured to transmit the plurality of messages in the queue when a trigger transmit message is received.

12. The luminaire network system according to claim 1, wherein the luminaire controller is configured to delete one or more messages in the queue or all messages in the queue when a trigger delete message is received.

13. The luminaire network system according to claim 1, wherein the luminaire controller is further configured for storing the messages in the storage device in a Round-Robin queue.

14. The luminaire network system according to claim 13, wherein the luminaire further comprises an image capturing device, and wherein the luminaire controller is further configured for storing image data captured by the image capturing device in the Round-Robin queue of the storage device.

15. A computer-readable medium comprising computer-executable instructions thereon which, when executed by a computer, causes the computer to perform the steps performed by the luminaire controller of the luminaire network system according to claim 1.

16. A luminaire network system comprising one or more luminaires, wherein a luminaire thereof comprises:
   a luminaire controller;
   an image capturing device configured for capturing image data; and
   a storage device configured to store messages to be transmitted in a queue, the queue of the storage device being a Round-Robin queue, wherein the luminaire controller is configured to:
include at least one of the image data captured by the image capturing device in a message and store it in the Round-Robin queue;
associate the message in the queue with an indication of a time,
wherein the indication of the time comprises a delay time period within which the message needs to be transmitted and a time reference, and wherein the time reference is a reference for a point in time on which the measured data included in the message was measured, or wherein the indication of the time comprises an absolute time by which the message needs to be sent, or wherein the luminaire controller is configured to select the indication of the time from a plurality of priority levels, each priority level being associated with a time before which the message needs to be transmitted;
check whether the indication of the time associated with at least one message of a plurality of messages in the Round-Robin queue indicates that the at least one message has to be transmitted; and
transmit the plurality of messages in the queue, when a result of the checking is that the at least one message has to be transmitted.

17. A luminaire network system comprising one or more luminaires, wherein a luminaire thereof comprises:
a luminaire controller;
at least one measurement device configured to measure data related to at least one of the corresponding luminaire or the environment thereof,
wherein the data measured by the at least one measurement device is any one of the following or a combination thereof: a measure indicative for a broken light source, a measure for the energy consumption of the luminaire, a light level, sound data, audio data, air quality data, image data, visibility data, electric grid perturbation data, temperature data, humidity data, and vibration data; and
a storage device configured to store messages to be transmitted in a queue,
wherein the luminaire controller is configured to:
process the measured data to provide processed data;
include at least one of the measured data or processed data based on the measured data in a message and store it in the queue of the storage device;
associate the message in the queue with an indication of a time,
wherein the indication of the time comprises a delay time period within which the message needs to be transmitted and a time reference and wherein the time reference is a reference for a point in time on which the measured data included in the message was measured, or wherein the indication of the time comprises an absolute time by which the message needs to be sent, or wherein the luminaire controller is configured to select the indication of the time from a plurality of priority levels, each priority level being associated with a time before which the message needs to be transmitted;
check whether the indication of the time associated with at least one message of a plurality of messages in the queue indicates that the at least one message has to be transmitted; and
transmit the plurality of messages in the queue, when a result of the checking is that the at least one message has to be transmitted.

* * * * *